United States Patent
Finger

[11] 3,804,063
[45] Apr. 16, 1974

[54] VERTICAL FISH FARM

[75] Inventor: John F. Finger, Beresford, S. Dak.

[73] Assignee: Sioux Corporation, Beresford, S. Dak.

[22] Filed: Feb. 1, 1973

[21] Appl. No.: 328,619

[52] U.S. Cl. ................................. 119/3
[51] Int. Cl. .......................... A01k 63/00
[58] Field of Search ...................... 119/3, 5

[56] References Cited
UNITED STATES PATENTS

| | | | |
|---|---|---|---|
| 3,716,025 | 2/1973 | Lawson | 119/3 |
| 2,944,513 | 7/1960 | Keely | 119/3 |
| 3,116,712 | 1/1964 | Ogden et al. | 119/3 |
| 3,726,251 | 4/1973 | Fremont | 119/3 |

*Primary Examiner*—Hugh R. Chamblee
*Attorney, Agent, or Firm*—Merchant, Gould, Smith & Edell

[57] ABSTRACT

A vertically elongated tank disposed within a building and having a perforated water circulating tube extending downwardly from the upper end of the tank for the greater part of the length of the tank. A water pump is disposed to receive water from the lower end portion of the tank and deliver water under pressure to the upper end of the circulating tube. A water heater is disposed to heat the water between the discharge outlet of the pump and the upper end of the circulating tube. An air heater is mounted in the building to receive air from outside the building and deliver heated air into the upper end portion of the tank above the normal level of water within the tank. The upper end of the tank has openings for admitting light to the interior of the tank, and for letting heated air escape from the tank to the interior of the building to warm the building during cold weather.

3 Claims, 1 Drawing Figure

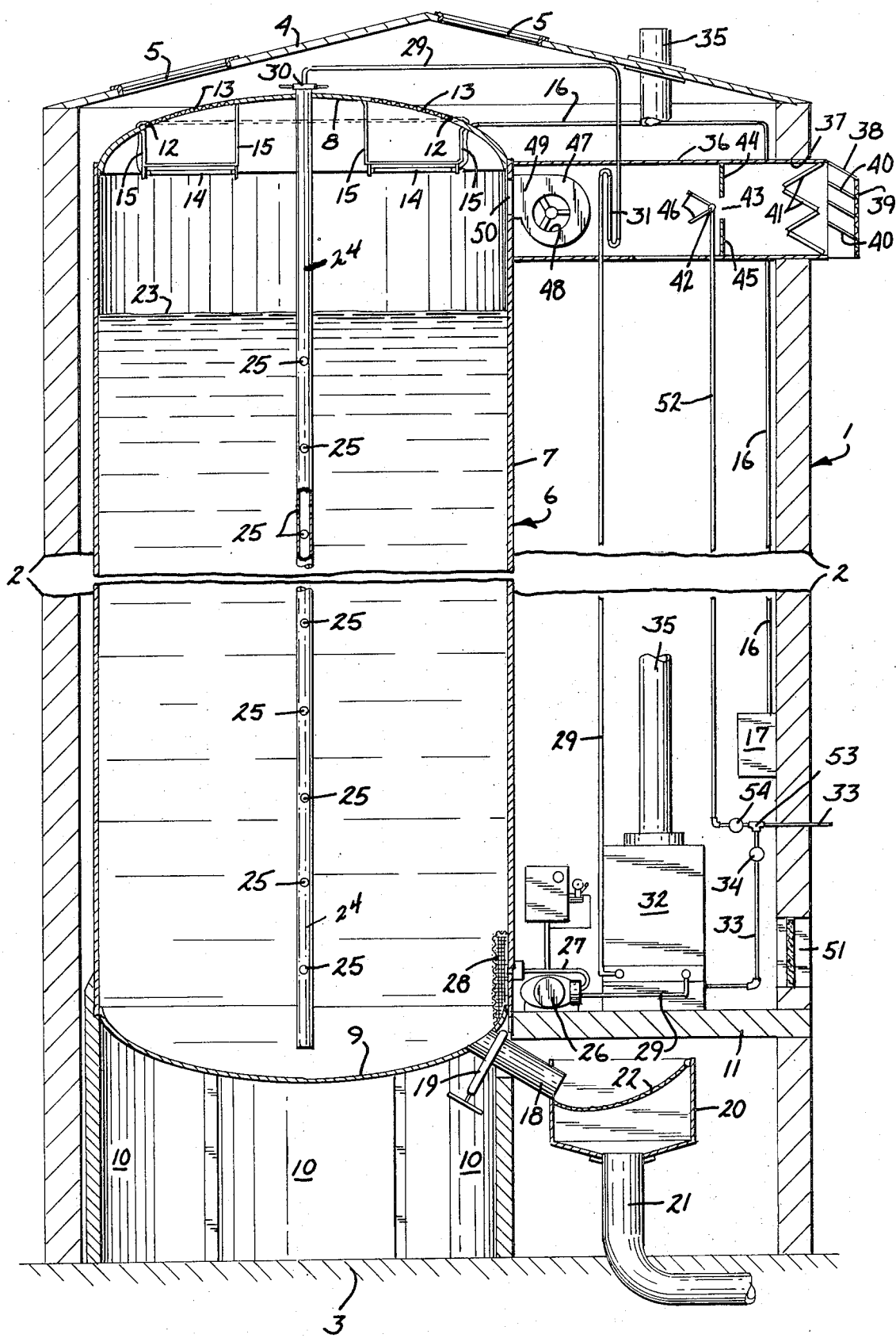

VERTICAL FISH FARM

BACKGROUND OF THE INVENTION

Heretofore, fish farms and fish hatcheries have consisted of ponds and pools, mostly located out of doors and subject to freezing in winter weather, as well as covering substantial areas of ground. In many of these, particularly where natural ponds are used as fish farms, little or no control is had over the temperature or of the physical qualities of the water. Further, many of these ponds are limited as to their qualities for raising various breeds of fish.

SUMMARY OF THE INVENTION

An important object of this invention is the provision of a fish farm which has a relatively large capacity while occupying a relatively small ground area.

Another object of this invention is the provision of a fish farm in which control is had over the temperature and other conditions of the water for effecting healthy growth of fish throughout freezing winter months in cold climates.

Still another object of this invention is the provision of a fish farm in which the fish may be harvested with a minimum of effort.

To the above ends, I provide a vertically elongated tank having openings in its upper end and an outlet pipe in its lower end, the tank being disposed within a building structure. A circulating tube within the tank extends longitudinally downwardly from the upper end of the tank for the greater part of the height thereof, and is provided with spaced apart openings to the interior of the tank. A pump in the building structure has an inlet connected by a pipe to the lower end portion of the tank, and an outlet connected to a discharge tube or pipe extending to the upper end of the circulating tube. The discharge tube extends through a water heating device and through an air heater. The air heater is mounted in the building near the upper end of the tank and has an air inlet end receiving air from the exterior of the building, a blower, and a warm air discharge end, for delivering heated air to the interior of the tank above the normal level of water within the tank. An air outlet opening in one of the building walls near ground level permits air flowing outwardly of the openings in the upper end of the tank to flow downwardly through the building and outwardly through the air outlet opening. Means is provided for illuminating the interior of the tank at desired times, and other means is provided for catching fish as they are discharged with water through the tank outlet pipe.

DESCRIPTION OF THE DRAWING

The single view of the drawing is partly diagrammatic and partly in vertical section through a building structure and fish raising tank, illustrating a preferred embodiment of this invention, some parts being broken away.

DETAILED DESCRIPTION OF THE PREFERRED EMBODIMENT

A building structure is indicated generally at 1, and is shown fragmentarily as comprising side walls 2 that extend upwardly from a foundation or base 3, and a roof 4 having spaced apart skylights or windows 5 therein. A vertically elongated fish raising tank 6 is disposed within the interior of the building 1, and includes a peripheral or cylindrical wall 7 and upper and lower end walls 8 and 9 respectively. The tank 6 is supported in upwardly spaced relation to the foundation 3 by legs 10. The building structure 1 further includes a working floor 11 disposed in upwardly spaced relation to the foundation 3, being preferably at a level with the lower end wall 9 of the tank 6. The tank 6 may be of any size suitable for the raising of fish in commercial quantities, the building structure 1 preferably being of a size to contain the added equipment necessary to the efficient operation of the tank 6. As an example, the tank 6 may be of a diameter in the neighborhood of 12 to 15 feet, and height or axial dimension thereof being conveniently between 40 and 80 feet. The tank 6 may be made from any suitable material such as iron or steel plate, preferably lined with ceramic material, or other suitable metal, such as stainless steel.

The upper end wall 8 of the tank 6 is provided with circumferentially spaced openings 12 that are preferably provided with removable screens or the like 13 so that air may pass readily to and from the interior of the tank 6. The openings 12 are also preferably disposed below the windows 5 in the roof 4, so that daylight may enter the interior of the tank 6. For the purpose of supplementing natural light entering the tank 6 from the windows 5 and screened openings 12, I provide a plurality of illuminating devices, such as fluorescent lamps 14 that are mounted on brackets 15 secured to the inner surface of the upper end wall 8. The lamps 14 are operated and controlled by conventional electrical conductors not shown, but extending to the lamps 14 through a conduit 16 that extends upwardly from a timing device, not shown, but which may be assumed to be contained within a control box 17 mounted on the interior of one of the side walls 2. The timer does not, in and of itself, comprise the instant invention; hence, detailed showing and description thereof is omitted in the interest of brevity.

The lower end wall 9 of the tank 6 is provided with a discharge pipe 18 equipped with a suitable valve 19 both of which are of a size to permit free movement of fish therethrough when the valve 19 is open. The discharge pipe 18 is disposed to empty into an open-topped receiver 20 having a drain conduit 21 at its bottom for disposal of water from the tank 6. The receiver 20 is provided with a mesh screen 22 of a size to permit free flow of water therethrough but which will bar movement of fish therethrough so that fish may be harvested from the tank 6 by merely opening the gate valve 19. The fish may be removed from the screen 22 manually or by any suitable mechanical means, not shown.

Water is admitted to the interior of the tank 6 by any desired and well known means to a predetermined level as indicated at 23. A water circulating tube 24 has its upper end secured to the upper end wall 8 and extends downwardly therefrom axially of the tank 6 for the greater part of the length of the tank 6, terminating at its lower end in slightly upwardly spaced relation to the lower end wall 9. The tube 24 is provided with a plurality of longitudinally spaced openings 25 through which water flows from the interior of the circulating tube 24 to the interior of the tank 6. A conventional motor-driven pump 26 is supported by the working floor 11 within the building structure 1 and has an inlet pipe 27 that communicates with the interior of the tank 6 through a screen 28 adjacent the lower end wall 9. The pump 26 discharges water into a discharge conduit 29 that extends upwardly from the pump 26 to the upper end of the circulating tube 24 to which it is connected, as indicated at 30. Near the level of the upper end wall 8, the discharge conduit 29 is looped or folded upon itself to provide a coil arrangement, indicated at 31.

A conventional hot water heater 32 is supported on the working floor 11 within the building structure 1, and is interposed in the pump discharge conduit 29 for heating the water therein prior to discharge of the water into the circulating tube 24. The heater is fed with fluid fuel through a fuel pipe 33 from a suitable source not shown, the fuel pipe 33 being provided with a control valve 34 and other conventional controls not shown. Gases of combustion from the water heater 32 escape from the building structure 1 through a flue 35 extending upwardly through the roof 4. It will be noted that the water heater 32 is used primarily during cold water periods to keep the water within the tank 6 at an optimum temperature for proper growth and well being of the fish within the tank 6. Thus, the invention contemplates usual temperature responsive control apparatus for operation of the water heater 32.

For the purpose of maintaining a supply of fresh air to the interior of the tank 6 above the level of the water therein, I provide an air supply system including an elongated housing 36 that extends outwardly through an opening 37 in one of the walls 2 and having an inlet hood 38 at its outer end equipped with a screen 39 and louvers 40 exterior of the building structure 1. Inwardly of the louvers 40, a plurality of air filter elements 41 are mounted in the housing 36, these being preferably of the type commonly used in air conditioning equipment to filter out dust and other foreign matter from air passing therethrough. A conventional fluid fuel burner tube 42 is disposed within the housing 36 inwardly of an opening 43 that is defined by spaced edges of a pair of vertically disposed upper and lower partition elements 44 and 45 respectively. The burner 42 includes a pair of radiator panels 46 which radiate heat to air passing inwardly through the opening 43. The inner end of the housing 36 is rigidly secured to the upper end portion of the cylindrical wall 7 of the tank 6, and has mounted therein a conventional motor-driven blower 47 having an inlet opening 48 which receives air flowing inwardly through the housing 36, and an outlet portion 49 aligned with an opening 50 in the tank wall 7 above the level 23 of water within the tank 6. Operation of the blower 47 causes a stream of air to flow inwardly through the inlet hood 38 and filter 41 toward the blower inlet opening 48 through the partition defined opening 43 and over the panels 46, air being discharged under pressure through the opening 50 to the interior of the tank 6. Air blown into the upper end portion of the tank 6 supplies oxygen to the water within the tank 6, the water being constantly moved by circulation thereof through the openings 25 in the tube 24. Air from the interior of the tank 6 escapes upwardly through the screens 13 to the upper end portion of the building structure 1. From thence, the air flows downwardly around the exterior of the tank 6 to heat the interior of the building structure in cold weather, air escaping from the building through a screened opening 51 in one of the building walls 2 just above the level of the working floor 11.

It will be appreciated that the burner 42 need not be in operation at temperatures above freezing or above optimum growth temperature. The coil portion 31 of the pump discharge conduit 29 is disposed within the housing 36 between the burner 42 and the blower 47, so that either the burner 42 or water heater 32, or both, may be used to heat the water being pumped to the circulating tube 24. The burner 42 is supplied with fluid fuel from the pipeline 33 through a branch pipe 52 connected to the pipe 33 by means of a conventional T-fitting 53 and provided with a control valve 54. Other temperature responsive control elements for the burner 42 are provided, these being conventional and not shown.

The tank may be loaded with fish through one or more of the openings 12 in the upper end wall 8 of the tank 6 by any suitable means, and food may also be introduced through one of the openings 12, if desired. The lamps 14 are utilized to simulate daylight to augment the light which enters the tank through the windows 5 and screened openings 12, whereby to provide longer daylight hours during the winter season. By providing a vertically elongated tank and suitable building therefor, a large fish raising capacity is obtained with the use of a relatively small ground area and, by housing the tank within a building structure, as described, extremely accurate control may be obtained over the living conditions of the fish, so that fish production may be maintained at an optimum level.

While I have shown and described a commercial embodiment of my vertical fish farm, it will be understood that the same is capable of modification without departure from the spirit and scope of the invention, as defined in the claims.

What is claimed is:

1. A vertical fish farm comprising:
   a. a building structure;
   b. a vertically elongated tank in said building structure for containing water to a predetermined level;
   c. a tube extending longitudinally within said tank from the upper end thereof for the greater part of the axial length of the tank and having a plurality of longitudinally spaced openings therein;
   d. a water pump in said building structure and having a water inlet and an outlet;
   e. inlet conduit means connecting the pump water inlet to said tank near the lower end of the tank;
   f. discharge conduit means extending from the pump outlet to said tube at the upper end of said tank;
   g. water heating means interposed in said discharge conduit means;
   h. air heating apparatus in said building structure and having an air inlet exterior of the building structure and an air discharge outlet disposed to direct heated air into the tank above the normal level of water in the tank;
   i. said tank having an opening in its upper end in spaced relation to said air discharge outlet for discharge of air therefrom into the interior of the building structure;
   j. and valve-equipped discharge means at the lower end of said tank for removal of water and fish therefrom; and
   k. said building structure defining an air discharge opening near the bottom of said tank for removal of air entering the interior of the building from the upper end of the tank.

2. The vertical fish farm defined in claim 1 in which said discharge conduit means includes a portion extending through said air heating apparatus wherein the temperature of water in said portion is affected by the temperature of air in said air heating apparatus.

3. The vertical fish farm defined in claim 1 in which said discharge means comprises an outlet pipe at the lower end of said tank and projecting outwardly therefrom, said outlet pipe and the valve thereof being of a predetermined size to permit passage of fish freely therethrough, and a drain underlying the discharge end of said outlet pipe and including strainer means for collecting fish being discharged from the tank through said outlet pipe.

* * * * *